(12) United States Patent
Trinchieri

(10) Patent No.: US 11,313,487 B2
(45) Date of Patent: Apr. 26, 2022

(54) SOLENOID VALVE

(71) Applicant: Dana Motion Systems Italia S.R.L., Reggio Emilia (IT)

(72) Inventor: Piergiorgio Trinchieri, Emilia (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 0 days.

(21) Appl. No.: 17/059,180

(22) PCT Filed: May 9, 2019

(86) PCT No.: PCT/EP2019/061970
§ 371 (c)(1),
(2) Date: Nov. 25, 2020

(87) PCT Pub. No.: WO2019/228777
PCT Pub. Date: Dec. 5, 2019

(65) Prior Publication Data
US 2021/0207732 A1 Jul. 8, 2021

(30) Foreign Application Priority Data
Jun. 1, 2018 (EP) .................................... 18425041

(51) Int. Cl.
*F16K 31/06* (2006.01)
*F16K 31/40* (2006.01)

(52) U.S. Cl.
CPC ........ *F16K 31/0679* (2013.01); *F16K 31/408* (2013.01); *F16K 31/0655* (2013.01)

(58) Field of Classification Search
CPC .................................................. F16K 31/0655
See application file for complete search history.

(56) References Cited

U.S. PATENT DOCUMENTS 2,916,252 A * 12/1959 Hobbs ................. F16K 31/0613
251/129.07
6,422,533 B1 * 7/2002 Harms ................ F16K 31/0613
251/129.1
(Continued)

FOREIGN PATENT DOCUMENTS

WO 0250462 A1 6/2002

OTHER PUBLICATIONS

European Patent Office, Extended European Search Report Issued in Application No. 18425041.3, dated Nov. 28, 2018, Germany, 7 pages.
(Continued)

*Primary Examiner* — Eric Keasel
(74) *Attorney, Agent, or Firm* — McCoy Russell LLP

(57) ABSTRACT

A solenoid valve is disclosed. The solenoid valve comprises: a fixed member having a tube portion; a mobile plunger positioned in the tube portion, the mobile plunger being axially movable between a first position and a second position; a rod coupled to the mobile plunger and having a spool for control of fluid flow, the rod being axially movable in the tube portion; an electromagnetic coil positioned externally to the fixed member; and an air gap positioned in the tube portion between the electromagnetic coil and the mobile plunger, wherein the air gap is formed in an internal surface of the tube portion.

10 Claims, 8 Drawing Sheets

(56) References Cited

U.S. PATENT DOCUMENTS

2006/0011245 A1*  1/2006  Suzuki .................. H01F 7/1607
                                                    137/625.65
2014/0145101 A1   5/2014  Ishibashi et al.

OTHER PUBLICATIONS

ISA European Patent Office, International Search Report and Written Opinion Issued in Application No. PCT/EP2019/061970, dated Sep. 20, 2019, WIPO, 12 pages.

* cited by examiner

SOLENOID VALVE

TECHNICAL FIELD

This disclosure relates generally to the field of electromagnetically controlled valves, and particularly to the field of solenoid valves.

BACKGROUND

Valves are used in a variety of technical applications for controlling the flow of a fluid. Electromagnetically controlled valves have an electromagnet and by means of the electromagnet, the valve can be opened and closed.

WO0250462 discloses an electromagnetically-actuated two-way two-position valve that is normally closed. The valve comprises an axially-mobile group which has an upper end that faces a fixed group. An obturator is intercepted and then drawn in an opening movement by the mobile group. A return spring displaces the obturator towards a closed position when the fixed group is deactivated. An air gap is comprised, in a radial direction, between a coil for activating the fixed group and the upper end of the mobile group.

The present disclosure is directed, at least in part, to improving or overcoming one or more aspects of the prior art system.

BRIEF SUMMARY OF THE INVENTION

The present disclosure describes a solenoid valve. The solenoid valve comprises a fixed member having a tube portion; a mobile plunger positioned in the tube portion, the mobile plunger being axially movable between a first and a second position; a rod coupled to the mobile plunger and having a spool for control of fluid flow, the rod being axially movable in the tube portion; an electromagnetic coil positioned externally to the fixed member; and an air gap positioned in tube portion between the electromagnetic coil and the mobile plunger, characterized in that the air gap is formed in an internal surface of the tube portion.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

Figure 1:
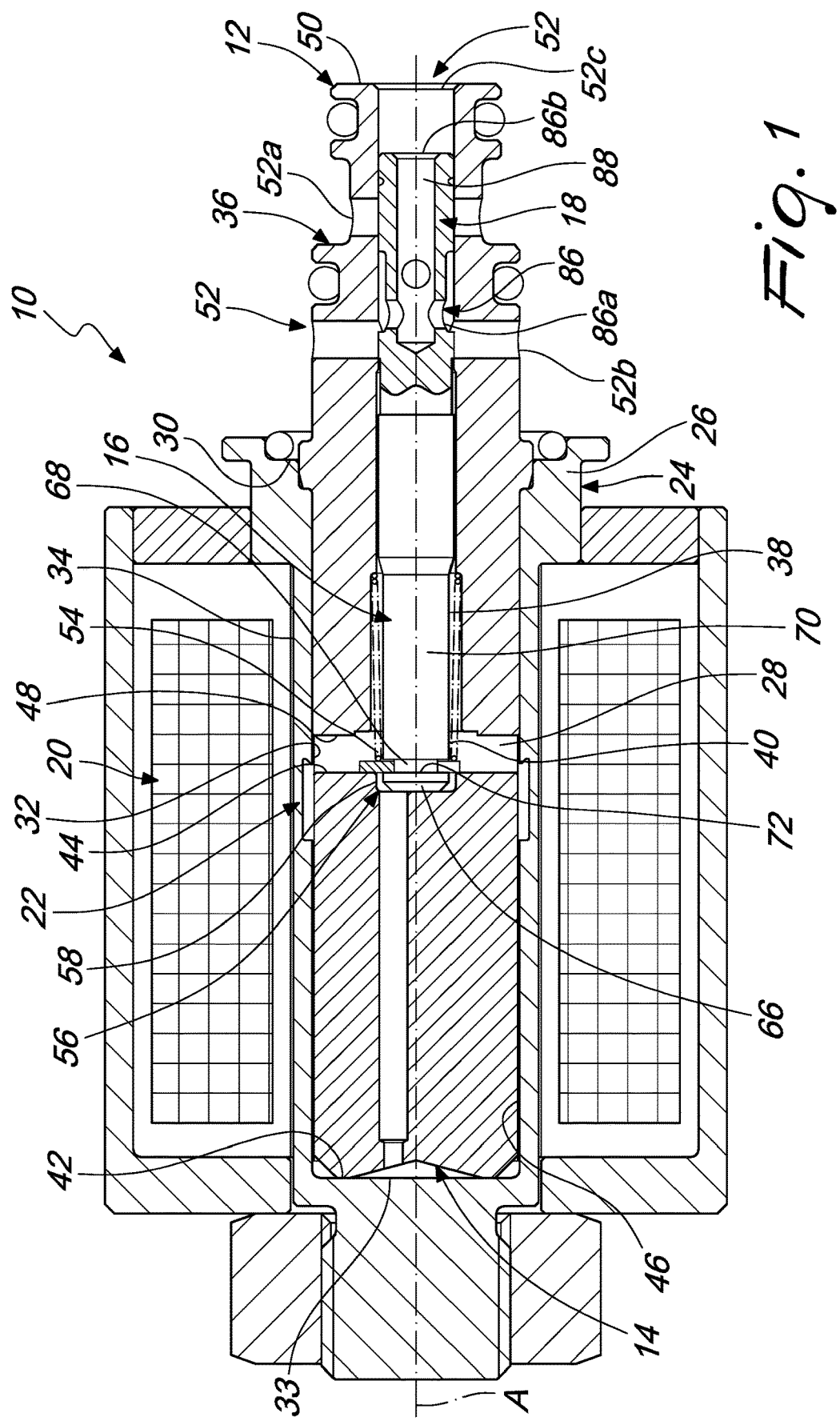
FIG. 1 is a cross-sectional view of a solenoid valve, in a first embodiment, according to the present disclosure in a deactivated configuration.

This disclosure generally relates to a solenoid valve for control of fluid flow. The solenoid valve is configured to concentrate magnetic flux for actuation of the spool. FIG. 1 illustrates a cross-section of the solenoid valve 10. Solenoid valve 10 is an electromagnetically actuated valve. The solenoid valve 10 comprises a fixed member 12, a mobile plunger 14, a rod 16 having a spool 18, an electromagnetic coil 20 and an air gap 22. FIGS. 1-4 illustrate a non-limiting first embodiment of the solenoid valve 10 in a three position, two way proportional pressure reducing valve.

Fixed member 12 comprises a tube portion 24. Tube portion 24 is hollow with a lateral wall 26 surrounding bore 28. The lateral wall 26 has an internal surface 32 and an external surface 34. Tube portion 24 has an opening 30. Bore 28 is delimited by the internal surface 32 and a base surface 33. The tube portion 24 is axially elongated. In an embodiment, the tube portion 24 may be cylindrical. Tube portion 24 is made from ferromagnetic material. In an embodiment, the tube portion 24 is at least partially made from ferromagnetic material.

The solenoid valve 10 may further comprise a valve body 36. The valve body 36 is mounted to the fixed member 12. The valve body 36 is mounted to the tube portion 24. Valve body 36 is mounted to the opening 30 of the tube portion 24. Valve body 36 has a central channel 38. Channel 38 has an aperture 40. Channel 38 communicates with the bore 28 through the aperture 40. Aperture 40 is formed on a first valve body end 48. First valve body end 48 is positioned in the tube portion 24. The valve body 36 has a second valve body end 50 formed opposite the first valve body end 48. Second valve body end 50 is positioned external to the tube portion 24.

Valve body 36 has a plurality of fluid ports 52. Fluid ports 52 are positioned external to the fixed member 12. Fluid ports 52 are spaced from the opening 30. Fluid ports 52 mutually communicate through the central channel 38. Second valve body end 50 is configured to carry at least one fluid port 52. Further, fluid ports 52 may be positioned on the lateral surface of the valve body 36.

In an embodiment, valve body 36 may be inserted into the bore 28. A portion of the valve body 36 extends from the opening 30 into the bore 28. In a further embodiment, the valve body 36 may be made from ferromagnetic material. Valve body 36 may serve to attract the mobile plunger 14 when the electromagnetic coil 20 is activated.

In an alternate embodiment, valve body 36 may be positioned at the opening 30. The valve body 36 does not extend from the opening 30 into the bore 28. In yet a further embodiment, the valve body 36 may be made from ferromagnetic material.

In an embodiment, the fixed member 12 further comprises a plunger portion (not shown). Plunger portion is located at an end opposite to the opening 30. The plunger portion axially extends from the tube portion 24. Plunger portion axially extends away from the opening 30. Plunger portion and tube portion 24 may be monolithically formed. In yet a further embodiment, the plunger portion may be made from ferromagnetic material.

In an embodiment, the solenoid valve 10 may further comprise a fixed plunger (not shown). The fixed plunger is positioned in the tube portion 24. Fixed plunger is positioned in the bore 28. Fixed plunger may be fixedly positioned against the inner surface 32 of the tube portion 24. In yet a further embodiment, the fixed plunger may be made from ferromagnetic material.

The mobile plunger 14 is positioned in the fixed member 12. Mobile plunger 14 is positioned in the tube portion 24. Mobile plunger 14 is axially movable in the tube portion 24. Mobile plunger 14 is axially movable in the bore 28. Mobile plunger 14 is configured to slidably move in the tube portion 24. Mobile plunger 14 may have a first end 42, a second end 44 and a contact surface 46. Contact surface 46 is bordered by the first and second ends 42, 44 at opposite sides. Contact surface 46 is in slidable contact with the internal surface 32 of the lateral wall 26 of the tube portion 24. First end 42 may abut the base surface 33 of the bore 28. Second end 44 may abut the first valve body end 48 of the valve body 36.

With respect to reference FIG. 1, the second end 44 is configured to have a coupling element 56 for coupling to rod 16. Coupling element 56 comprises a hole 58. Hole 58 is centrally positioned at the second end 44. The mobile plunger 14 is axially movable between a first and a second position. The mobile plunger 14 may move towards the base surface 33 to the first position. The mobile plunger 14 may move in a first direction of travel. The mobile plunger 14 may move towards the valve body 36 to the second position. The mobile plunger 14 may move in a second direction of travel. First and second positions are the extreme points of travel of the mobile plunger 14. In an embodiment, the limits of travel of the mobile plunger 14 may be determined by magnetic forces. The mobile plunger 14 may be adjacent the base surface 33 at the first position. The mobile plunger 14 may be adjacent the valve body 36 at the second position. In an alternate embodiment, the limits of travel of the mobile plunger 14 may be determined by the structures in the bore 28. In a further embodiment, mobile plunger 14 may abut the base surface 33 at a first end of travel that defines the first position. Mobile plunger 14 may abut the valve body 36 at a second end of travel that defines the second position. In an alternate further embodiment, mobile plunger 14 may abut a fixed plunger at a second end of travel that defines the second position.

The solenoid valve 10 further comprises an elastic member 54. Elastic member 54 is provided to return the mobile plunger 14 from an electromagnetically actuated position. In an embodiment, the elastic member 54 may be compressed when the mobile plunger 14 is at an electromagnetically actuated position. In an embodiment, the elastic member 54 may be extended when the mobile plunger 14 is at an electromagnetically actuated position. The elastic member 54 may be positioned between the mobile plunger 14 and the valve body 36.

With reference to FIG. 1, the rod 16 is coupled to the mobile plunger 14. Rod 16 is axially elongated. The rod 16 is axially movable in the tube portion 24. Rod 16 is supported by the mobile plunger 14 in the bore 28. Rod 16 extends into the channel 38 of the valve body 36 through aperture 40. Rod 16 is axially movable in the channel 38.

Rod 16 has a coupling end 64. Coupling end 64 comprises a head 66 and a collar 68. Head 66 is positioned at the terminal point of the rod 66. The head 66 is connected to a stem 70 though the collar 68. Collar 68 has a reduced diameter with respect to the head 66 and the stem 70. Head 66 has a ledge 72 extending over the collar 68. Coupling end 64 couples to the coupling element 56 of the mobile plunger 14. The head 66 fits into the hole 58. Rod 16 moves correspondingly with the mobile plunger 14 between the first and second position. The rod 16 may move along the first or the second directions of travel with the mobile plunger 14.

The spool 18 is positioned at an opposite end of the rod 16 relative to the coupling end 64. In an embodiment, spool 18 is integrated into the rod 16. In an alternate embodiment, spool 18 is coupled to the rod 16. The spool 18 spool extends into the valve body 36. Spool 18 controls fluid flow through the fluid ports 52 in the valve body 36. Spool 18 moves correspondingly with the mobile plunger 14. The spool 18 is positionable to control fluid flow through the valve body 36 as the mobile plunger 14 moves between the first and second position. Spool 18 comprises fluid ports 86 and a conduit 88 for flow of fluid.

The electromagnetic coil 20 is positioned externally to the fixed member 12. Electromagnetic coil 20 is positioned relative to the mobile plunger 14 so as to effect actuation thereof upon activation. In an embodiment, electromagnetic coil 20 is positioned in axial correspondence to the valve body 36 so as to effect actuation the mobile plunger 14 at activation.

Electromagnetic coil 20 is positioned to axially correspond to the valve body 36. Electromagnetic coil 20 is positioned to partially overlap the valve body 36. Electromagnetic coil 20 is positioned to axially correspond to the mobile plunger 14. Electromagnetic coil 20 is positioned to partially overlap the mobile plunger 14. Electromagnetic coil 20 is positioned to axially correspond to the mobile plunger 14 at the second end 44. Electromagnetic coil 20 is positioned to partially overlap the second end 44 of the mobile plunger 14. Electromagnetic coil 20 is positioned to axially correspond to the air gap 22. Electromagnetic coil 20 is positioned to overlap air gap 22.

The air gap 22 is positioned in tube portion 24. The air gap 22, in the tube portion 22, is positioned between the electromagnetic coil 20 and the mobile plunger 14. The air gap 22 is axially located along the tube portion 24 so as to be positioned between the electromagnetic coil 20 and the mobile plunger 14. The air gap 22 is positioned between the electromagnetic coil 20 and the mobile plunger 14 in the radial direction relative to a longitudinal axis A of the tube portion 24. In an embodiment, the air gap 22 is positioned remote from the base surface 33 of the bore 28. The air gap 22 is spaced from the valve body 36.

Figure 2:
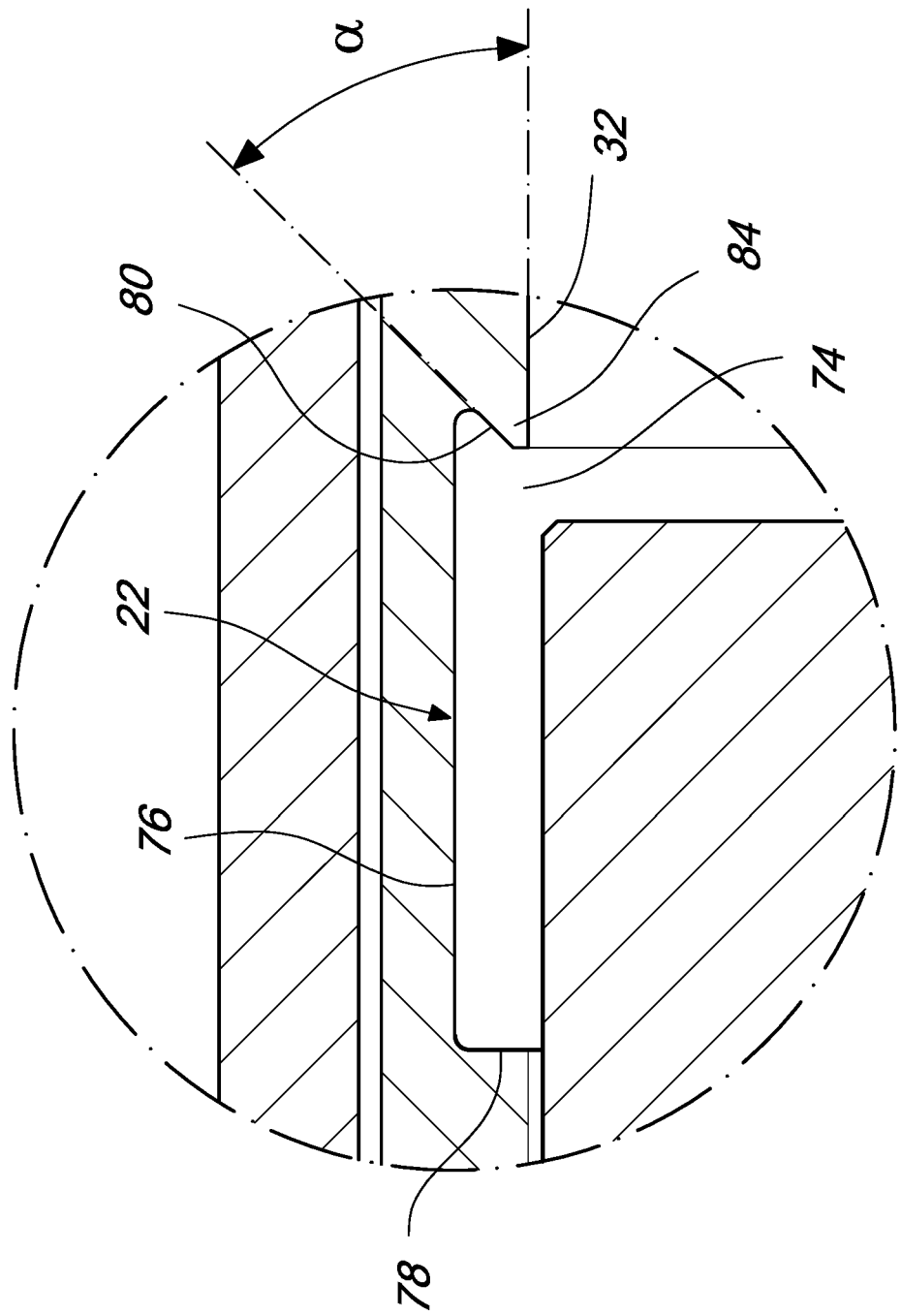
FIG. 2 is a magnified cross-sectional view of an air gap in the solenoid valve of FIG. 1.

With reference to FIG. 2, the air gap 22 is formed in the internal surface 32 of the tube portion 24. Air gap 22 extends radially from the internal surface 32 into the lateral wall 26 of the tube portion 24. Air gap 22 surrounds the bore 28. Air gap 22 has a slot 74. Air gap 22 opens to the bore 28 through the slot 74. Slot 74 faces the mobile plunger 14. Slot 74 extends around the inner surface 32. In an embodiment, the air gap 22 is annular. Air gap 22 is formed as an annular channel that encircles the bore 28. Slot 74 is formed as an annular opening.

In an embodiment, the air gap 22 is positioned adjacent the first end 42 of the mobile plunger 14. The air gap 22 is positioned adjacent the first end 42 of the mobile plunger 14 in a radial direction relative to a longitudinal axis A of the tube portion 24. The air gap 22 encircles the first end 42. In an alternative embodiment, the air gap 22 is positioned adjacent the second end 44 of the mobile plunger 14. The air gap 22 is positioned adjacent the second end 44 of the mobile plunger 14 in a radial direction relative to a longitudinal axis A of the tube portion 24. The air gap 22 encircles the second end 44. The air gap 22 overlaps the second end 42. In yet a further embodiment, the solenoid valve 10 may have a first and a second air gap 22. The first air gap 22 is positioned adjacent the first end 42 of the mobile plunger 14. The second air gap 22 is positioned adjacent the second end 44 of the mobile plunger 14.

The air gap 22 has an axially extending bottom surface 76. The air gap 22, formed as an annular channel, has an axially extending bottom surface 76. The bottom surface 76 extends in the same direction as the lateral wall 26. Bottom surface 76 forms an annular surface of the air channel. Bottom surface 76 is concentric with the external surface 34 of the lateral wall 26. Bottom surface 76 is concentric with the slot 74.

The air gap 22 has a linear side 78. The air gap 22, formed as an annular channel, has a linear side 78. Linear side 78 extends from the bottom surface 76. Linear side 78 extends to the internal surface 32. Linear side 78 delimits one side of the slot 74. The linear side 78 is substantially perpendicular to the bottom surface 76. Linear side 78 may be substantially perpendicular to the longitudinal axis A of the tube portion 24. Linear side 78 forms an annular lateral surface of the air channel. Linear side 78 extends radially from the internal surface 32 into the lateral wall 26 of the tube portion 24. In an embodiment, the linear side 78 is proximate to the mobile plunger 14 at the first position. The concentration of the magnetic flux increases with the increasing depth of the air gap 22. The depth of the air gap 22 may correspond to the length of the linear side 78.

The air gap 22 has an inclined side 80. The air gap 22, formed as an annular channel, has an inclined side 80. Inclined side 80 is opposite the linear side 78. Inclined side 80 inclines towards the linear side 78. Inclined side 80 inclines into the annular channel. Inclined side 80 extends from the bottom surface 76. Inclined side 80 extends to the internal surface 32. Inclined side 80 delimits the opposite side of the slot 74. The width of the slot 74 is determined by the distance between the linear side 78 and the inclined side 80. The width of the air gap 22 increases with the depth thereof. The transverse distance between the linear side 78 and the inclined side 80 increases with the increase in distance from the slot 74 to the bottom surface 76. In an embodiment, the inclined side 88 is distal from the mobile plunger 14 at the first position. The inclined side 88 is distal from the second end 44 of the mobile plunger 14 at the first position.

The inclined side 80 is substantially inclined relative to the internal surface 32 of the lateral wall 26. The inclined surface 80 and internal surface 32 have an angle α therebetween. The angle α has a range of 45 to 60 degrees. Inclined side 80 may be substantially inclined relative to the longitudinal axis A of the tube portion 24. Inclined side 80 forms an annular inclined lateral surface of the air channel. The inclined side 80 is substantially inclined relative to the bottom surface 76.

An apex 84 is positioned in the air gap 22. The apex 84 is positioned in the annular channel. The apex 84 is formed between the inclined side 80 and the internal surface 32 of the tube portion 24. Apex 84 is positioned between the bottom surface 76 and the bore 28. Apex 84 is positioned between the bottom surface 76 and the bore 28 in the radial direction relative to the longitudinal axis A of the tube portion 24. Apex 84 is positioned between the bottom surface 76 and the mobile plunger 14. Apex 84 is positioned between the bottom surface 76 and the mobile plunger 14 in the radial direction relative to the longitudinal axis A of the tube portion 24. Magnetic flux is concentrates in the apex 84.

In operation the movement of the mobile plunger 14 between the first and second position opens and closes the air gap 22. The mobile plunger 14 moves relative to the air gap 22. The contact surface 46 moves to close or open the slot 74. As the mobile plunger 14 moves from the first position to the second position the second end 44 may move towards the apex 84 thereby closing the slot 74. As the length of slot 74 is reduced, relative distance between the second end 44 and the apex 84, the magnetic flux increases until the slot 74 is closed when the second end 44 is level with the apex 84. The valve 10 starts to open so as to enable fluid flow. The mobile plunger 14 may move further so that the second end 44 moves beyond the apex 84.

As the mobile plunger 14 moves from the second position to the first position the second end 44 may move away from the apex 84. The valve 10 starts to close when the second end 44 moves from being level with the apex 84 towards the linear side 78.

FIG. 1 illustrates the solenoid valve 10 in the deactivated configuration. The electromagnetic coil 20 is not activated so as to effect a movement of the mobile plunger 14 to the second position. The mobile plunger 14 remains in the first position. The elastic member 54, positioned between the mobile plunger 14 and the valve body 36, is not compressed.

The spool 18 is positioned in the valve body 36 so that second valve body fluid ports 52b are not in communication with first spool fluid ports 86a. The first valve body fluid ports 52a are not in communication with the first spool fluid ports 86a. No fluid flows through the solenoid valve 10.

Figure 3:
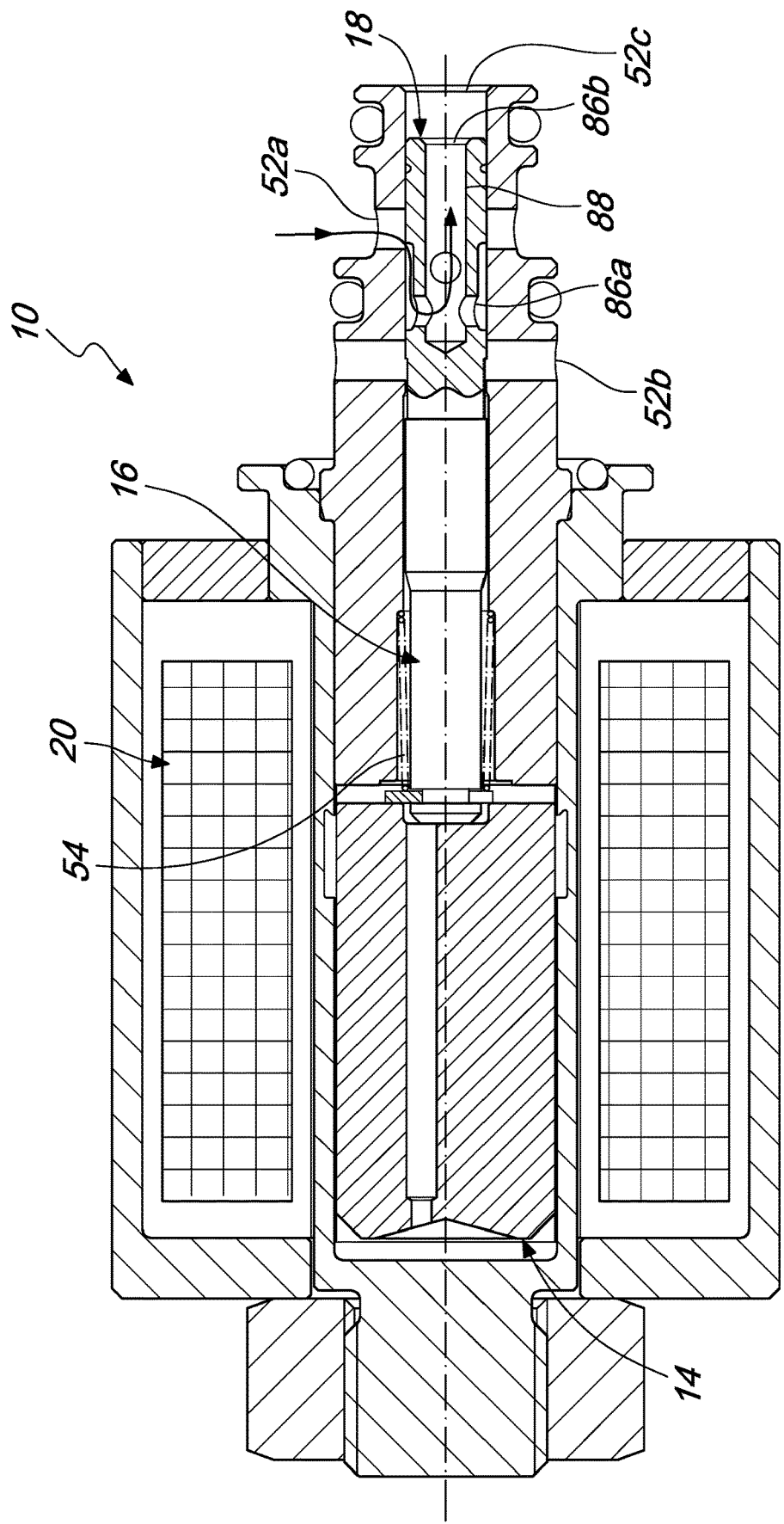
FIG. 3 is a cross-sectional view of the solenoid valve in a first active configuration.

FIG. 3 illustrates the solenoid valve 10 in operation and in a first active configuration. The electromagnetic coil 20 is activated so as to effect a movement of the mobile plunger 14 to the second position. The mobile plunger 14 moves towards the valve body 36. Mobile plunger 14 is actuated to the apex 84 of the air gap 22. The elastic member 54, positioned between the mobile plunger 14 and the valve body 36, is compressed.

The rod 16 and the spool 18 are correspondingly moved. The spool 18 is positioned in the valve body 36 so that first valve body fluid ports 52a are positioned to communicate with first spool fluid ports 86a. The path of the fluid flow is indicated by an arrow. Fluid flows through the first valve body fluid ports 52a into the first spool fluid ports 86a. Fluid flows into the conduit 88 and out through the second spool fluid port 86b. Fluid flows into the channel 38 and out through the third valve body fluid port 52c.

The strength of the magnetic force is proportional to the amount of current with which is supplied to the electromagnetic coil. When the solenoid valve 10 is actuated, pressurised fluid flows through first valve body fluid ports 52a to first spool fluid ports 86a and into the conduit 88. The magnetic force is opposed by the fluid pressure acting on the spool 18 in the conduit 88. The solenoid valve 10 finds an equilibrium when the magnetic force is equal to the force generated by the fluid pressure flowing through the first spool fluid ports 86a.

When the electromagnetic coil 20 is deactivated, the mobile plunger 14 is no longer attracted to the valve body 36. The elastic member 54 pushes the mobile plunger 14 away from the valve body 36. The rod 16 and the spool 18 are correspondingly moved. The spool 18 is positioned in the valve body 36 so that the first valve body fluid ports 52a is not in communication with the first spool fluid ports 86a.

Figure 4:
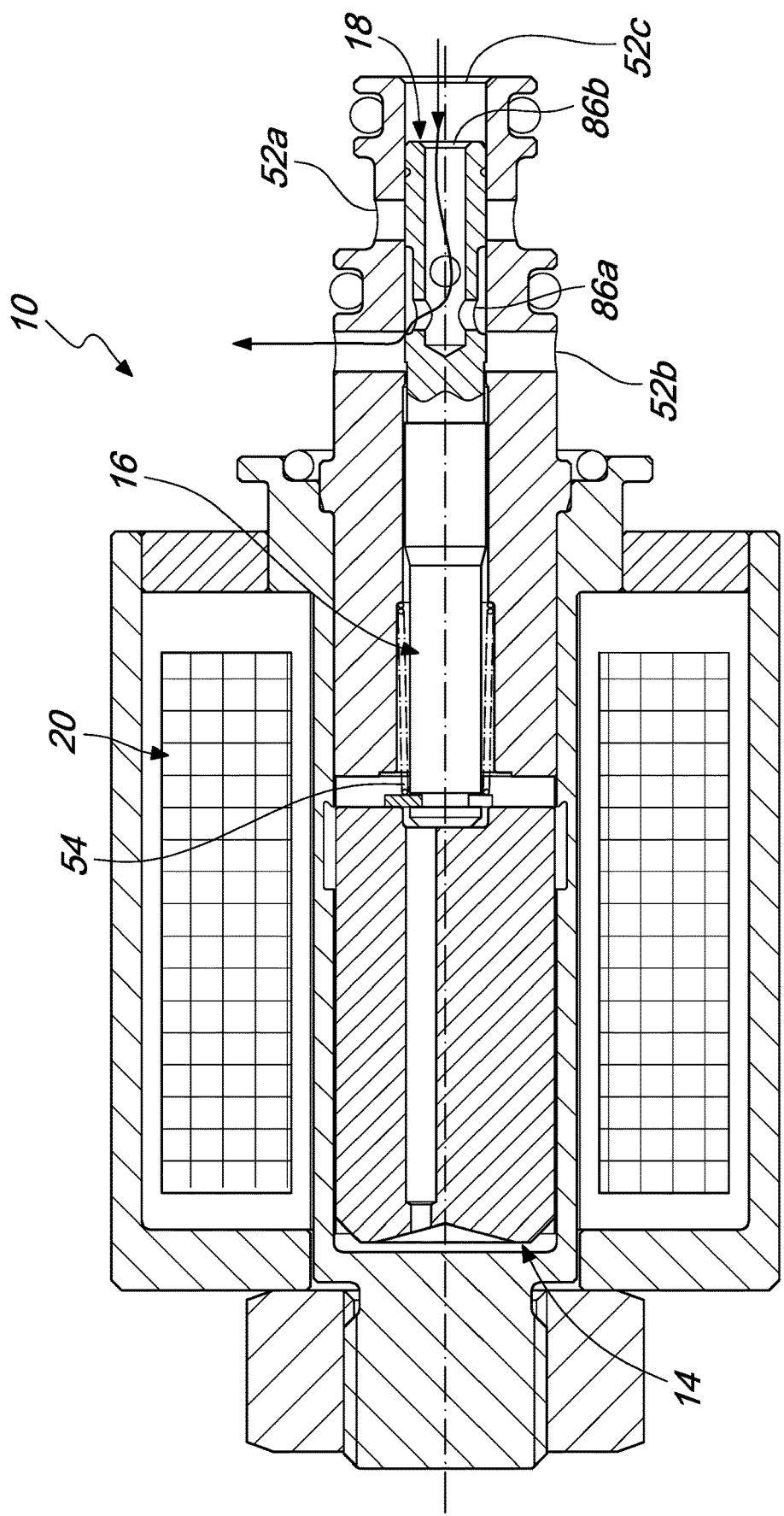
FIG. 4 is a cross-sectional view of the solenoid valve in a second active configuration.

FIG. 4 illustrates the solenoid valve 10 in operation and in a second active configuration. If the flow rate of the pressurized fluid from first valve body fluid ports 52a to first spool fluid ports 86a increases the pressure in conduit 88 increases correspondingly and the force generated increases correspondingly. If the force in the conduit 88 exceeds the magnetic force, the mobile plunger 14 moves accordingly. The mobile plunger 14 moves towards the first position. The mobile plunger 14 moves partially away from the valve body 36.

The spool 18 is positioned in the valve body 36 so that second valve body fluid ports 52b are positioned to be in communication with first spool fluid ports 86a. The first valve body fluid ports 52a are not in communication with the first spool fluid ports 86a.

The path of the pressurized fluid flow is indicated by an arrow. of the pressurized fluid flows into the channel 38 through the third valve body fluid port 52c. The pressurized fluid flows into the conduit 88 through second spool fluid port 86b and to the first spool fluid ports 86a. The pressurized fluid flow exits the valve body 36 through second valve body fluid ports 52b from the first spool fluid ports 86a.

The solenoid valve 10 moves between the first and second configuration until the force generated by the pressurized fluid flow is balanced with magnetic force.

Figure 5:
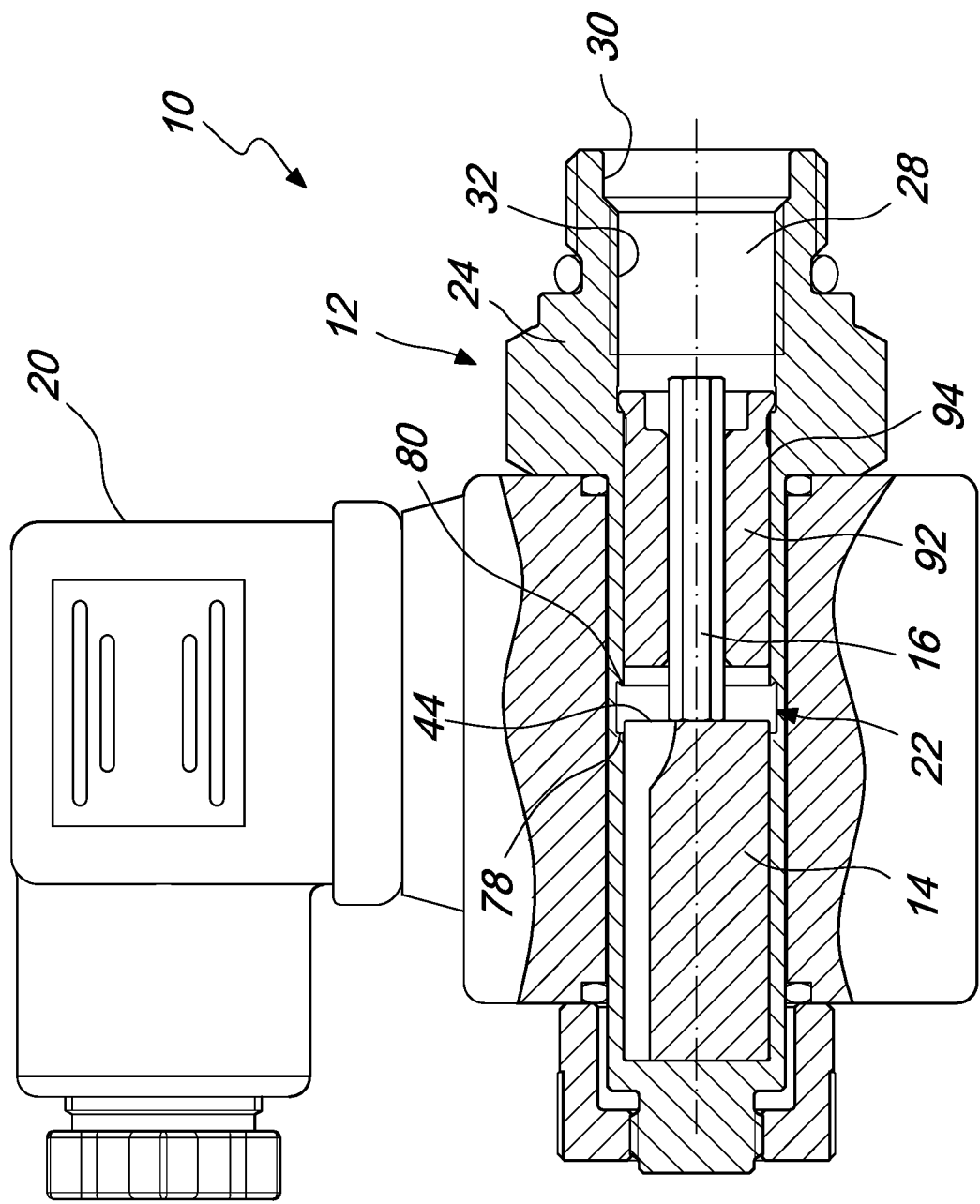
FIG. 5 is a cross-sectional view of a second embodiment of the solenoid valve.

FIG. 5 illustrates a second embodiment of the solenoid valve 10. The specific features with respect to the second embodiment will now be described. Valve body 36 is not illustrated. A fixed plunger 92 is positioned in the tube portion 24. Fixed plunger 92 is positioned in the bore 28. Fixed plunger 92 is positioned between the mobile plunger 14 and the opening 30 of the tube member 24. Fixed plunger 92 may be fixedly positioned against the inner surface 32 of the tube portion 24. Fixed plunger 92 has a through hole 94. Rod 16 extends from the mobile plunger 14 through the through hole 94. Rod 16 is axially movable in the through hole 94.

The second end 44 of the mobile plunger 14 faces the fixed plunger 92. The air gap 22 is positioned adjacent the fixed plunger 92. Air gap 22 is positioned adjacent the second end 44 of the mobile plunger 14. The air gap 22 overlaps the second end 44 of the mobile plunger 14. The linear side 78 is proximate to the mobile plunger 14 at the first position. The inclined side 80 is distal from the mobile plunger 14 at the first position. The inclined side 80 is distal from the second end 44 of the mobile plunger 14 at the first position.

Electromagnetic coil 20 is positioned to axially correspond to the fixed plunger 92. Electromagnetic coil 20 is positioned to partially overlap fixed plunger 92. Electromagnetic coil 20 is positioned to axially correspond to the mobile plunger 14. Electromagnetic coil 20 is positioned to partially overlap the mobile plunger 14. Electromagnetic coil 20 is positioned to axially correspond to the mobile plunger 14 at the second end 44. Electromagnetic coil 20 is positioned to partially overlap the second end 44 of the mobile plunger 14. Electromagnetic coil 20 is positioned to axially correspond to the air gap 22. Electromagnetic coil 20 is positioned to overlap air gap 22. At the activation of the electromagnetic coil 20 the mobile plunger 14 is actuated to move from the first position towards the fixed plunger 92. The mobile plunger 14 may abut the fixed plunger 92 at the second position.

Figure 6:
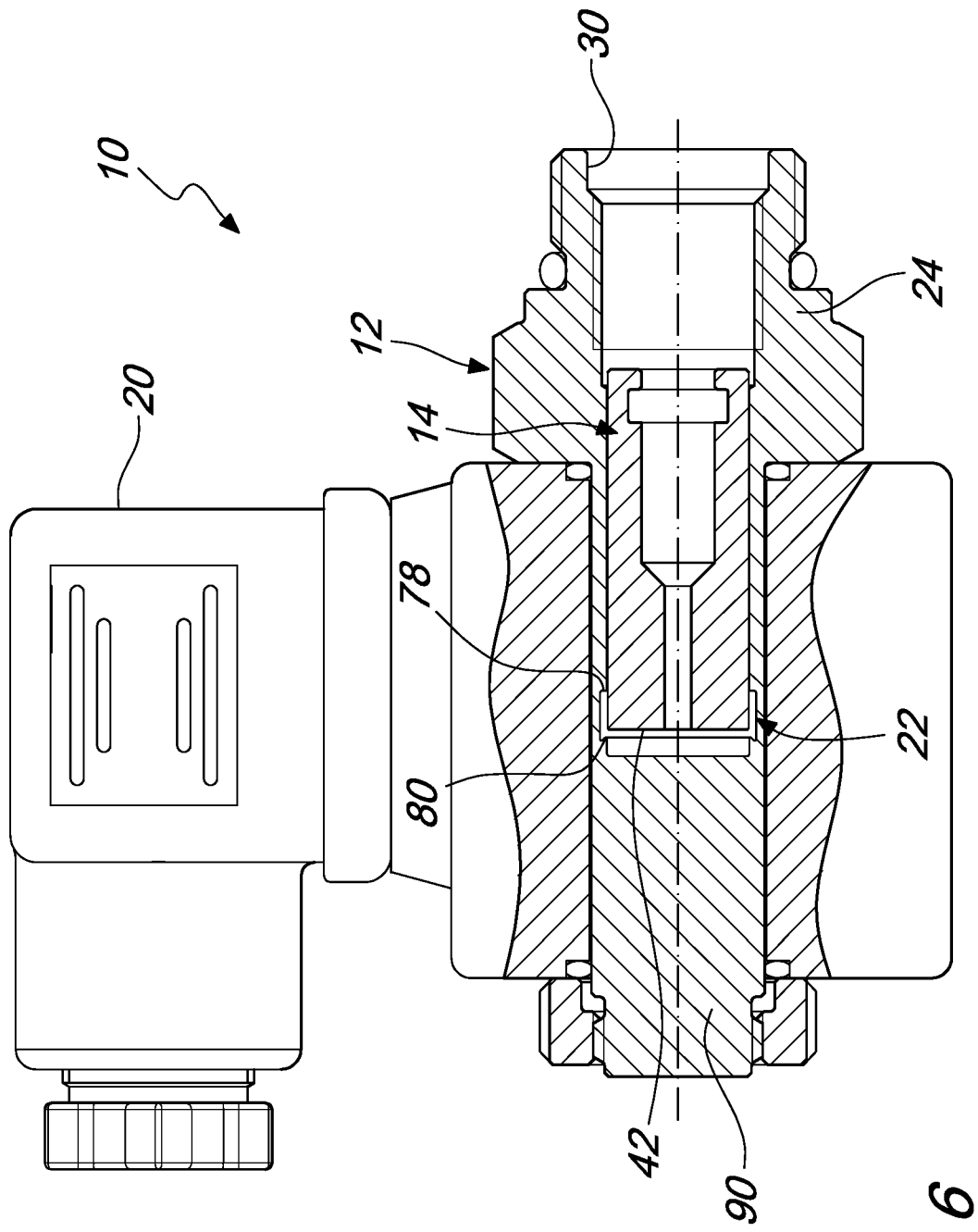
FIG. 6 is a cross-sectional view of a third embodiment of the solenoid valve.

FIG. 6 illustrates a third embodiment of the solenoid valve 10. The specific features with respect to the third embodiment will now be described. Valve body 36 and the rod 16 are not illustrated. Fixed member 12 comprises the tube portion 24 and a plunger portion 90. Plunger portion 90 is located at an end opposite to the opening 30. The plunger portion 90 axially extends from the tube portion 24. Plunger portion 90 axially extends away from the opening 30. Plunger portion 90 and tube portion 24 may be monolithically formed.

The first end 42 of the mobile plunger 14 faces the plunger portion 90. The base surface 33 of the bore 28 is formed by the plunger 90. The air gap 22 is positioned adjacent the plunger portion 90. Air gap 22 is positioned adjacent the first end 42 of the mobile plunger 14. The air gap 22 overlaps the first end 42 of the mobile plunger 14. The linear side 78 is proximate to the mobile plunger 14 at the first position. The inclined side 88 is distal from the mobile plunger 14 at the first position. The inclined side 88 is distal from the first end 42 of the mobile plunger 14 at the first position.

Electromagnetic coil 20 is positioned to axially correspond to the plunger portion 90. Electromagnetic coil 20 is positioned to partially overlap plunger portion 90. Electromagnetic coil 20 is positioned to axially correspond to the mobile plunger 14. Electromagnetic coil 20 is positioned to axially correspond to the first end 42 mobile plunger 14. Electromagnetic coil 20 is positioned to partially overlap mobile plunger 14. Electromagnetic coil 20 is positioned to partially overlap the mobile plunger 14 at the first end 42. Electromagnetic coil 20 is positioned to axially correspond to the air gap 22. Electromagnetic coil 20 is positioned to overlap air gap 22. At the activation of the electromagnetic coil 20 the mobile plunger 14 is actuated to move from the first position towards the plunger portion 90. The mobile plunger 14 may abut the plunger portion 90 at the second position.

Figure 7:
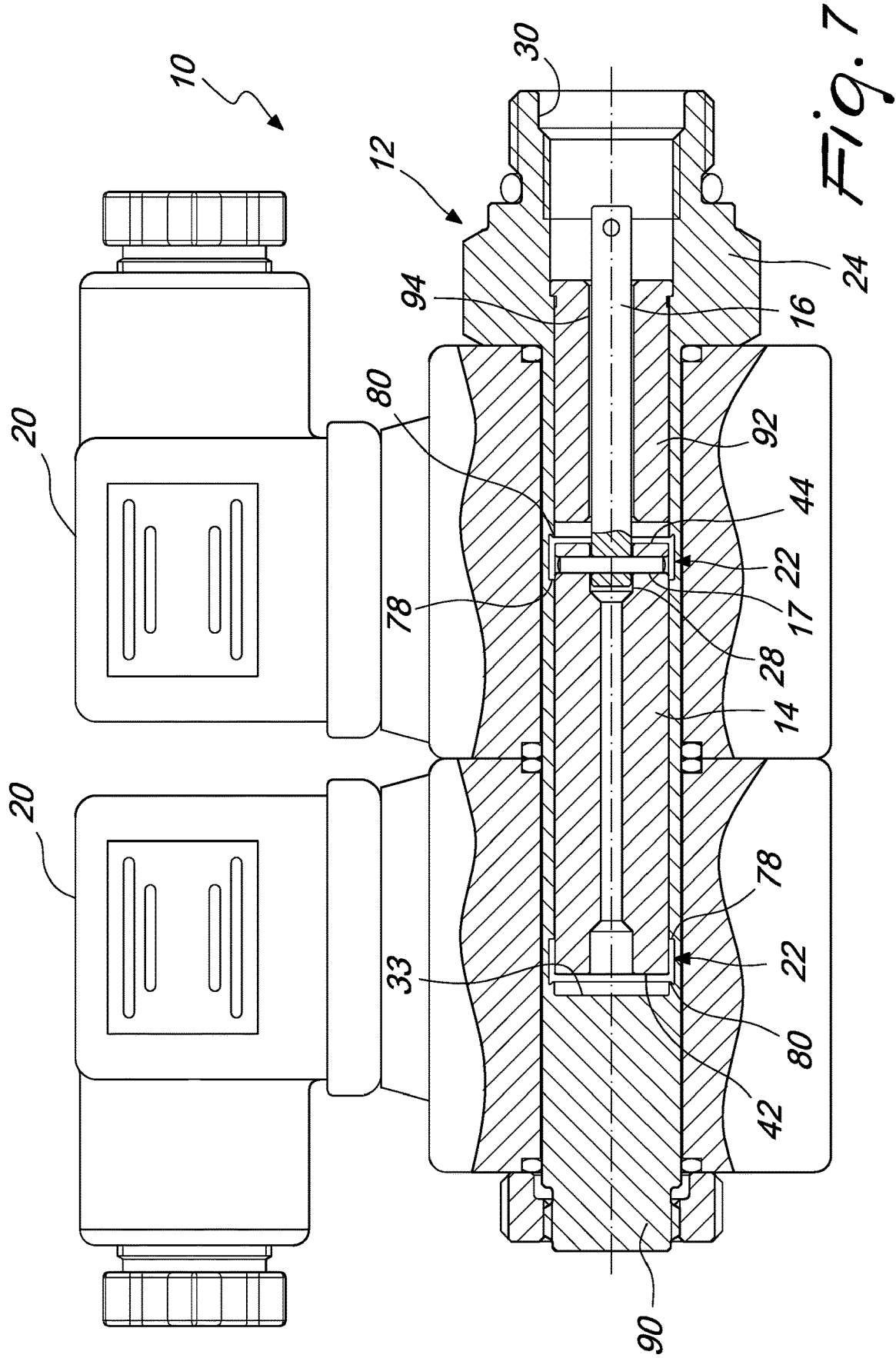
FIG. 7 is a cross-sectional view of a fourth embodiment of the solenoid valve.
Figure 8:
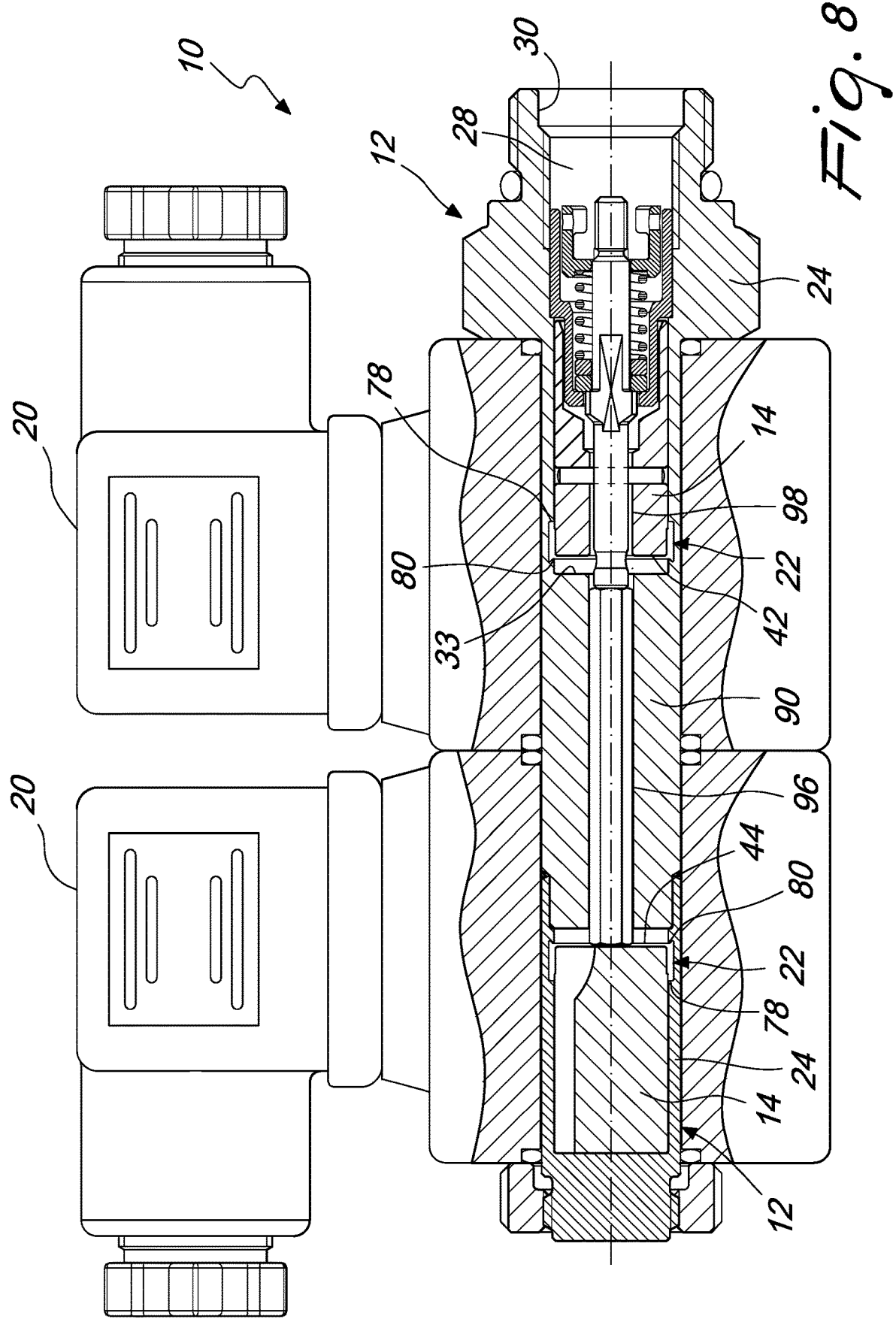
FIG. 8 is a cross-sectional view of a fifth embodiment of the solenoid valve.

FIG. 7 illustrates a fourth embodiment of the solenoid valve 10. The specific features with respect to the fourth embodiment will now be described. Valve body 36 is not illustrated. Fixed member 12 comprises the tube portion 24 and a plunger portion 90. Plunger portion 90 is located at an end opposite to the opening 30. The plunger portion 90 axially extends from the tube portion 24. Plunger portion 90 axially extends away from the opening 30. Plunger portion 90 and tube portion 24 may be monolithically formed.

The first end 42 of the mobile plunger 14 faces the plunger portion 90. The base surface 33 of the bore 28 is formed by the plunger 90. A first air gap 22 is positioned adjacent the plunger portion 90. The first air gap 22 is positioned adjacent the first end 42 of the mobile plunger 14. The first air gap 22 overlaps the first end 42 of the mobile plunger 14. The linear side 78 is proximate to the mobile plunger 14 at the first position. The inclined side 88 is distal from the mobile plunger 14 at the first position. The inclined side 88 is distal from the first end 42 of the mobile plunger 14 at the first position. The first position is the neutral position of the mobile plunger 14. The second position of the mobile plunger 14 may be a first actuated position or a second actuated position.

A first electromagnetic coil 20 is positioned to axially correspond to the plunger portion 90. The first electromagnetic coil 20 is positioned to partially overlap plunger portion 90. The first electromagnetic coil 20 is positioned to axially correspond to the mobile plunger 14. The first electromagnetic coil 20 is positioned to axially correspond to the first end 42 of the mobile plunger 14. The first electromagnetic coil 20 is positioned to partially overlap mobile plunger 14. The first electromagnetic coil 20 is positioned to partially overlap the mobile plunger 14 at the first end 42. The first electromagnetic coil 20 is positioned to axially correspond to the first air gap 22. The first electromagnetic coil 20 is positioned to overlap the first air gap 22. At the activation of the first electromagnetic coil 20 the mobile plunger 14 is actuated from the first position to move towards the plunger portion 90 at a first actuated position. The mobile plunger 14 may abut the plunger portion 90 at the first actuated position. In an embodiment, the mobile plunger 14 may be actuated from the second actuated position to move towards the plunger portion 90 at the first actuated position.

A fixed plunger 92 is positioned in the tube portion 24. Fixed plunger 92 is positioned in the bore 28. Fixed plunger 92 may be fixedly positioned against the inner surface 32 of the tube portion 24. Fixed plunger 92 is positioned between the mobile plunger 30 and the opening 30 of the tube member 24. Fixed plunger 92 has a though hole 94. Rod 16 extends from the mobile plunger 14 through the through hole 94. Rod 16 is axially movable in the through hole 94. Rod 16 is coupled to the mobile plunger 14 through a pin 17. The pin 17 traverses through the mobile plunger 14 and the rod 16. Rod 16 is accommodated in the bore 28 of the mobile plunger 14.

A second air gap 22 is positioned in the tube portion 24 between a second electromagnetic coil 20 and the mobile plunger 14. The second air gap 22 is formed in the internal surface 32 of the tube portion 24. The second end 44 of the mobile plunger 14 faces the fixed plunger 92. The second air gap 22 is positioned adjacent the fixed plunger portion 92. The second air gap 22 is positioned adjacent the second end 44 of the mobile plunger 14. The second air gap 22 overlaps the second end 44 of the mobile plunger 14. The linear side 78 is proximate to the mobile plunger 14 at the first position. The linear side 78 is proximate to the second end 44 of the mobile plunger 14 at the first position. The inclined side 88 is distal from the mobile plunger 14. The inclined side 88 is distal from the second end 44 of the mobile plunger 14.

The second electromagnetic coil 20 is positioned externally to the fixed member 12. The second electromagnetic coil 20 may be positioned adjacent the first electromagnetic coil 20. The second electromagnetic coil 20 is positioned to axially correspond to the fixed plunger 92. The second electromagnetic coil 20 is positioned to partially overlap fixed plunger 92. The second electromagnetic coil 20 is positioned to axially correspond to the mobile plunger 14. The second electromagnetic coil 20 is positioned to axially correspond to the second end 44 of the mobile plunger 14. The second electromagnetic coil 20 is positioned to partially overlap mobile plunger 14. The second electromagnetic coil 20 is positioned to partially overlap the mobile plunger 14 at the second end 44. The second electromagnetic coil 20 is positioned to axially correspond to the second air gap 22. The second electromagnetic coil 20 is positioned to overlap the second air gap 22. At the activation of the second electromagnetic coil 20 the mobile plunger 14 is actuated to move from the first positioned towards the fixed plunger 92 at the second actuated position. The mobile plunger 14 may abut the fixed plunger 92 at the second actuated position. In an embodiment, the mobile plunger 14 may be actuated from the first actuated position to move towards the fixed portion 92 at the second actuated position. FIG. 12 illustrates a fifth embodiment of the solenoid valve 10. The specific features with respect to the fifth embodiment will now be described. Valve body 36 is not illustrated. Fixed member 12 comprises the tube portion 24 and a plunger portion 90. Plunger portion 90 is located at an end opposite to the opening 30. The plunger portion 90 axially extends from the tube portion 24. Plunger portion 90 axially extends away from the opening 30. Plunger portion 90 and tube portion 24 may be monolithically formed. Plunger portion 90 has a though hole 96. Rod 16 extends from the plunger portion 90 through the through hole 96. Rod 16 is axially movable in the through hole 96.

A first end 42 of a first mobile plunger 14 faces the plunger portion 90. The base surface 33 of the bore 28 is formed by the plunger portion 90. A first air gap 22 is positioned adjacent the plunger portion 90. The first air gap 22 is positioned adjacent the first end 42 of the mobile plunger 14. The first air gap 22 overlaps the first end 42 of the mobile plunger 14. The linear side 78 is proximate to the first mobile plunger 14 at the first position. The inclined side 88 is distal from the first mobile plunger 14 at the first position. The inclined side 88 is distal from the first end 42 of the first mobile plunger 14 at the first position. The first mobile plunger 14 has a through channel 98. Rod 16 extends from the first mobile plunger 14 through the through hole 98. Rod 16 is coupled to the second end 44 of the mobile plunger 16. Rod 16 extends through the first end 42 of the mobile plunger 14.

A first electromagnetic coil 20 is positioned to axially correspond to the plunger portion 90. The first electromagnetic coil 20 is positioned to partially overlap plunger portion 90. The first electromagnetic coil 20 is positioned to axially correspond to the first mobile plunger 14. The first electromagnetic coil 20 is positioned to axially correspond to the first end 42 of the first mobile plunger 14. The first electromagnetic coil 20 is positioned to partially overlap first mobile plunger 14. The first electromagnetic coil 20 is positioned to partially overlap the first mobile plunger 14 at the first end 42. The first electromagnetic coil 20 is positioned to axially correspond to the first air gap 22. The first electromagnetic coil 20 is positioned to overlap the first air gap 22. At the activation of the first electromagnetic coil 20 the first mobile plunger 14 is actuated to move from the first position towards the plunger portion 90 at the second position. The first mobile plunger 14 may abut the plunger portion 90 at the second position.

The solenoid valve 10 further comprises a second fixed member 12 having a second tube portion 24. The second tube portion 24 is connected to the plunger portion 90 of the first tube portion 24. The second tube portion 24 may be welded to the plunger portion 90 of the first tube portion 24. A second mobile plunger 14 is positioned in the second tube portion 24. The second mobile plunger 14 being axially movable between a first and a second position. The rod 16 is coupled to the second mobile plunger 14 wherein the rod 16 extends from the second mobile plunger 14 through the plunger portion 90 to the first mobile plunger 14. A second electromagnetic coil 20 is positioned externally to the first and second fixed members 12, 12. A second air gap 22 is positioned in second tube portion 24 between the second electromagnetic coil 20 and the second mobile plunger 14. The second air gap 22 is formed in an internal surface 32 of the second tube portion 24.

The second end 44 of the second mobile plunger 14 faces the plunger portion 90. The second air gap 22 is positioned adjacent the plunger portion 90. The second air gap 22 overlaps the second end 44. The second air gap 22 is positioned adjacent the second end 44 of the second mobile plunger 14. The linear side 78 is proximate to the second mobile plunger 14 at the first position. The inclined side 88 is distal from the second mobile plunger 14 at the first position. The inclined side 88 is distal from the second end 44 of the second mobile plunger 14 at the first position.

The second electromagnetic coil 20 is positioned to axially correspond to the plunger portion 90. The second electromagnetic coil 20 may be adjacent to the first electromagnetic coil. Electromagnetic coil 20 is positioned to partially overlap plunger portion 90. Second electromagnetic coil 20 is positioned to axially correspond to the second mobile plunger 14. Second electromagnetic coil 20 is positioned to axially correspond to the second end 44 of the second mobile plunger 14. Second electromagnetic coil 20 is positioned to axially correspond to the second mobile plunger 14. Second electromagnetic coil 20 is positioned to partially overlap the mobile plunger 14 at the second end 44. Second electromagnetic coil 20 is positioned to axially correspond to the second air gap 22. Second electromagnetic coil 20 is positioned to overlap second air gap 22. At the activation of the second electromagnetic coil 20 the second mobile plunger 14 is actuated to move from the first position towards the plunger portion 90. The second mobile plunger 14 may abut the plunger portion 90 at the second position.

The skilled person would appreciate that foregoing embodiments may be modified or combined to obtain the solenoid valve 10 of the present disclosure.

INDUSTRIAL APPLICABILITY

This disclosure describes a solenoid valve 10 having a concentration of the magnetic flux in the tube 24 at the air gap 22. The magnetic flux is further concentrated at the apex 84. The concentration of the magnetic flux increases with the increasing depth of the air gap 22. The concentration of the magnetic flux in the air gap 22 and at the apex 84 enables flattening of the magnetic force curve when the linear position of the mobile plunger changes, so that in varying the stroke of the mobile plunger the magnetic force remains more constant. The portion of the solenoid valve 10 that concentrates magnetic flux is not made of non-magnetic material shown such as a bronze welding, but it consists of the air collected in the air gap 22.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The disclosures in European Patent Application No. 18425041.3 from which this application claims priority are incorporated herein by reference.

The invention claimed is:

1. A solenoid valve comprising:
a fixed member having a tube portion;
a valve body mounted to the tube portion, the valve body having one or more radially-extending valve body fluid ports;
a mobile plunger positioned in the tube portion, the mobile plunger being axially movable between a first position and a second position;
a rod coupled to the mobile plunger and having a spool for control of fluid flow, the rod being axially movable in the tube portion, the spool having an axially-extending conduit, and the spool having one or more radially-extending spool fluid ports;
an electromagnetic coil positioned externally to the fixed member; and
an air gap positioned in the tube portion between the electromagnetic coil and the mobile plunger,
wherein the air gap is formed as an annular channel in an internal surface of the tube portion,
wherein the air gap has an axially extending bottom surface, a linear side extending from the bottom surface and substantially perpendicular to the bottom surface, and an inclined side opposite the linear side,
wherein an apex positioned in the air gap is formed between the inclined surface and internal surface of the tube portion,
wherein the mobile plunger is actuated axially toward the apex by a magnetic force generated by the electromagnetic coil; and
wherein the mobile plunger is actuated axially away from the apex by a force generated by a pressurized fluid flowing from the one or more valve body fluid ports to the one or more spool fluid ports.

2. The solenoid valve of claim 1, wherein the air gap extends radially from the internal surface into a lateral wall of the tube portion.

3. The solenoid valve of claim 1, wherein the air gap has a slot facing the mobile plunger.

4. The solenoid valve of claim 1, wherein an angle α is formed between the inclined side and the internal surface, and wherein the angle α has a range of 45 to 60 degrees.

5. The solenoid valve of claim 1, wherein the apex is positioned between the bottom surface and a bore.

6. The solenoid valve of claim 1, wherein the fixed member has a plunger portion, wherein the first end faces the plunger portion, and wherein the air gap is positioned adjacent the plunger portion.

7. The solenoid valve of claim 1, wherein the fixed member has a fixed plunger, wherein the second end faces the fixed plunger, and wherein the air gap is positioned adjacent the fixed plunger and the second end is positioned adjacent the air gap.

8. The solenoid valve of claim 1, wherein the electromagnetic coil is a first electromagnetic coil, and wherein the air gap is a first air gap, the solenoid valve further comprising:
a fixed plunger positioned in the tube portion between the mobile plunger and an opening of the tube portion;
a second electromagnetic coil positioned externally to the fixed member; and
a second air gap positioned in the tube portion between the second electromagnetic coil and the mobile plunger, wherein the second air gap is formed in an internal surface of the tube portion.

9. The solenoid valve of claim 1, wherein the fixed member is a first fixed member, the tube portion is a first tube portion, the mobile plunger is a first mobile plunger, the electromagnetic coil is a first electromagnetic coil, and the air gap is a first air gap, the solenoid valve further comprising:
a second fixed member having a second tube portion, the second tube portion being connected to a plunger portion of the first tube portion;
a second mobile plunger positioned in the second tube portion, the second mobile plunger being axially movable between a first position and a second position;
a second electromagnetic coil positioned externally to the first fixed member and the second fixed member; and
a second air gap positioned in the second tube portion between the second electromagnetic coil and the second mobile plunger,
wherein the second air gap is formed in an internal surface of the second tube portion, and wherein the rod is coupled to the second mobile plunger, and the rod extends from the second mobile plunger through the plunger portion to the first mobile plunger.

10. The solenoid valve of claim 1, wherein the mobile plunger is not actuated axially when the force generated by the pressurized fluid is balanced with the magnetic force.

* * * * *